United States Patent [19]

Vuarnesson

[11] Patent Number: 4,887,250
[45] Date of Patent: Dec. 12, 1989

[54] APPARATUS FOR REPRODUCING THE APPEARANCE OF HEAVENLY BODIES

[76] Inventor: Bernard Vuarnesson, 1 Blvd. St. Michel, 75006 Paris, France

[21] Appl. No.: 185,065

[22] Filed: Apr. 22, 1988

[30] Foreign Application Priority Data

May 12, 1987 [FR] France ................... 87 0669

[51] Int. Cl.⁴ .............................. G04B 19/26
[52] U.S. Cl. ...................... 368/15; 368/17; 434/284
[58] Field of Search .................. 368/15–20; 434/284–293

[56] References Cited

U.S. PATENT DOCUMENTS

| 307,636 | 11/1884 | Ferguson | 434/284 |
| 477,846 | 6/1892 | Rassweiler | 434/284 |
| 754,845 | 3/1904 | Burke | 368/16 |
| 988,471 | 4/1911 | Jones | 434/286 |
| 1,131,263 | 3/1915 | Park | 434/293 |
| 1,750,505 | 3/1930 | Bulka | 368/16 |
| 2,349,515 | 5/1944 | Oberst | 434/287 |

FOREIGN PATENT DOCUMENTS

| 44971 | 3/1988 | Fed. Rep. of Germany | 434/284 |
| 284708 | 4/1931 | Italy | 434/287 |
| 1244703 | 7/1986 | U.S.S.R. | 434/284 |
| 14958 | 6/1904 | United Kingdom | 434/293 |

Primary Examiner—Bernard Roskoski
Attorney, Agent, or Firm—Alan H. Levine

[57] ABSTRACT

An apparatus for reproducing the appearance of heavenly bodies including a cover having an opaque wall defining a substantially circular opening, and a disc-like or spherical part representative of a heavenly body sized to substantially fill the opening in the cover. The part and cover are relatively rotatable about an axis which passes through the center of the opening in the cover and along a diameter of the part. The opaque wall of the cover may be hemispherical, planar, or tubular. The part may represent the moon or a celestial vault. The apparatus may include a base which supports the cover and part and houses a mechanism for rotating one of the cover and part with respect to the other.

7 Claims, 1 Drawing Sheet

U.S. Patent  Dec. 12, 1989  4,887,250
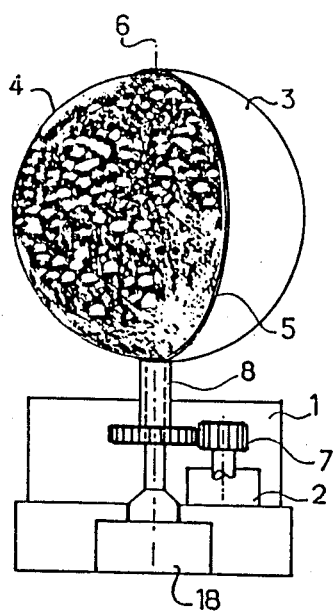
FIG. 1
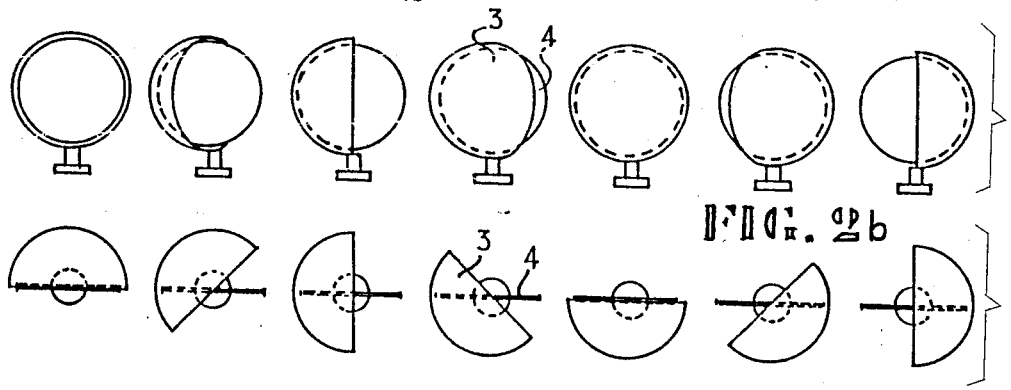
FIG. 2a
FIG. 2b
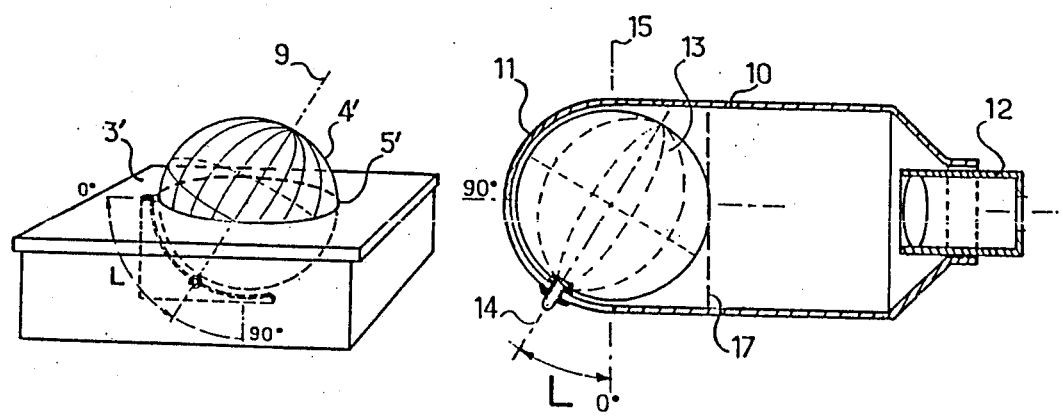
FIG. 3
FIG. 4

APPARATUS FOR REPRODUCING THE APPEARANCE OF HEAVENLY BODIES

The present invention relates to instruments for reproducing the appearance of heavenly bodies.

Known instruments for representing heavenly bodies, or the celestial vault, at a given time and a given place, offer a representation that is markedly different from reality. For instance, known systems for representing the phases of the moon on watches or clocks comprise a moving disc containing two images of the moon disappearing in succession behind a cover made of a double semi-circle that gives a very imperfect impression of the portion of the lunar disc visible at each of the moon's "ages". In particular, these known systems give the first and last quarters the appearance of crescents, rather than perfect semi-circles, as they appear in reality.

Similarly, known portable systems for representing the stars that are visible at a given time, comprising a rotating map partly hidden by a cover, the opening of which has a variable form depending on the observation latitude, cannot be used at every location on the earth, and because of the representation of the celestial vault in the form of a planisphere, they give a distorted image of reality.

One object of the invention is to provide a device which presents an improved rendition, on the selected scale, of the appearance of a heavenly body, and particularly of the actual observable form and surface of the lunar disc at every stage, whatever the observation point may be.

Another object of the invention is to provide a device which presents an improved rendition, on the selected scale, of the appearance of the celestial universe as a whole, whatever the observation point may be.

This goal is achieved, according to the invention, by the cooperation of a part, representing a heavenly body, and a screen or cover, including an opaque wall with an opening having substantially the form of a circle. The part has substantially the form of a disc or of a sphere of such a nature as to fill the opening in the screen or cover, and be concentric with that opening, the part or cover being free to rotate around an axis that passes through the center of the opening and which extends along a diameter of the part. Thus, the part has a diameter just slightly smaller than the diameter of the opening so as to permit relative rotation between the part and cover.

The expression "substantially" the form of a circle (or of a disc, or of a sphere, or of a hemisphere) in the present description and in the claims means that the form is, preferably, the geometrical form that is designated, but may also be a closely-related geometrical form. For example, the circular contour may be replaced by a polygonal contour, preferably a polygon with a large number of sides, or by a curve contour having only approximately the form of a circle, e.g., a contour constituted by a series of curved portions, etc. The sphere may be replaced by a polyhedron, etc.

The opaque wall of the cover or screen has, preferably, a form that is at last approximately hemispherical, but it may have other forms, particularly a tubular form, preferably cylindrical, or another plane form.

Described below are various versions of the device covered by the invention, with reference to the accompanying drawings, in which:

FIG. 1 is a schematic elevational view, of an embodiment of the invention that is particularly suitable for rendering the appearance of the moon;

FIG. 2a, 2b are diagrams, in elevation and plan, of the device of FIG. 1, reproducing the phases of the moon;

FIG. 3 is a perspective of another embodiment of the invention, particularly suitable for rendering the appearance of the celestial sphere; and FIG. 4 is a cross-sectional view of yet another embodiment of the invention.

The following description, and the drawings, bring out a number of advantageous features of devices covered by the present invention.

In the version shown in FIG. 1, the device includes a base 1, supporting a hollow hemispherical cover or screen 3, and a disc 4, the surface of which is covered by a representation of the surface of the moon as seen from earth. The base circle 5 of cover 3 constitutes a circular opening which is vertical when the device is set down on a support surface. The cover is free to rotate around an axis 6, arranged along the vertical diameter of opening 5. This rotation may be controlled manually, or preferably by a mechanism housed in the base and connected to the cover by a shaft 8, which projects upwardly from the base. In FIG. 1 the mechanism is schematically illustrated as including a motor 2 and a transmission 7. Disc 4 is vertical, and its vertical diameter coincides with the plane of opening 5. The drive mechanism is designed to rotate the cover at the speed of one rotation per 29.5 days.

In the interest of a better rendition of the relief features of the moon, disc 4 may be replaced by a sphere, on which there is a photograph, a map, or a relief of the moon, possibly a transparent or translucent sphere lighted from the inside. The sphere may also be an inflatable ball. When the device includes a base 1, the base may contain a lunar clock mechanism, as indicated schematically at 18 in FIG. 1.

FIG. 2 shows, in elevation (upper row) and in plan view (lower row), the device in operation, giving a representation of the successive phases of the moon. The same device, with the appropriate changes, can be used to represent the appearance or the apparent movement of a different heavenly body or a planet.

FIG. 3 illustrates another embodiment in which the cover 3' is either parallelepipedic or hemispherical, and has a circular opening 5' which is horizontal when the device is put on a support surface. The part is a sphere 4', which is concentric with the cover and which rotates in the cover around an axis 9, through which the plane of the opening 5' passes, the opening forming an angle L with the axis, corresponding to the latitude of a given observation point. The visible surface of the part 4' represents the celestial vault. By making the celestial sphere rotate, after orienting it (north axis up for observing the sky in the northern terrestrial hemisphere, or south axis up for observations in the southern hemisphere), at the rate of one rotation per day, one displays, in succession, all of the visible stars and only the visible stars at every moment, at any terrestrial observation point whatsoever.

FIG. 4 represents a device of the telescope type, the cover of which is a tube 10, preferably cylindrical, closed at one end by a hemispherical cover 11. The opening of the cover is located in the plane 15 of a vertical cross-section of the tube. In the device shown, the cover opening is an end cross-section of the tube 10. The tube is equipped, at the end opposite cover 11, with a means for observing the inside of the tube, e.g., an eye-piece 12. Part 13 is concentric with the cover opening, and is mounted so as to rotate around an axis 14 making an angle L with the plane 15.

Part 13 is, for instance, a disc or a sphere bearing a representation of the moon, or a sphere that bears a representation of the celestial vault. Depending on the representation, axis 14 is located in plane 15, or is oblique to this plane at an angle L (the case shown). Part 13, particularly in the case of a sphere, may be an inflatable part, and the tubular wall 10 will then accommodate a transverse screen 17, against which the part 13 can flatten itself, more or less, when it is inflated.

On a larger scale, the invention may be used in a planetarium to observe the changes in the phases of the moon or of the planets in the solar system that undergo the same lighting phenomena as our natural satellite, or in order to display the appearance of the movement of the celestial vault.

The inventio has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. An apparatus for reproducing the appearance of the phases of the moon, comprising:

a cover having a opaque wall defining an opening having substantially the form of a circle, a part representative of the moon, the part having substantially the form of a disc or sphere and so sized as to be capable of substantially filling the opening in the cover, means for supporting the part in a non-rotatable manner, and means for supporting the cover for rotation with respect to the part about an axis which passes through the center of the opening in the cover and along a diameter of the part, whereby rotating the cover, while viewing the part in a direction perpendicular to the axis, causes the portion of the part unobscured by the cover to represent the phases of the moon.

2. An apparatus as defined in claim 1 wherein the opaque wall of the cover is substantially hemispherical, the basic circle of the hemisphere coinciding with the opening in the cover, and the axis of rotation extending along a diameter of the opening.

3. An apparatus as defined in claim 2 wherein the axis of rotation is vertical.

4. An apparatus as defined in claim 2 wherein the cover supporting means includes a base upon which the cover is mounted, the opening in the cover being in a vertical plane when the base is set upon a support surface.

5. An apparaus as defined in claim 1 wherein the cover is a hollow hemisphere, and wherein the cover supporting means includes a base supporting a shaft and mechanism within the base for rotating the shaft, the cover being mounted on the shaft for rotation therewith, the axis of the shaft passing through the center of the opening in the cover, and the part is a disc or sphere mounted on the base, the part representing the lunar surface and being concentric with the opening in the cover.

6. An apparatus as defined in claim 5 including a clock carried by the base, the clock indicating the lunar days.

7. An apparatus as defined in claim 1 including a clock mechanism for rotating the cover at speed of one revolution each 29.5 days.

* * * * *